United States Patent [19]
Hata

[11] Patent Number: 5,501,131
[45] Date of Patent: Mar. 26, 1996

[54] DECORATIVE LIGHT BLINKING DEVICE USING PLL CIRCUITRY FOR BLINKING TO MUSIC

[75] Inventor: Shuji Hata, Tokyo, Japan

[73] Assignee: Jalco Co., Ltd., Tokyo, Japan

[21] Appl. No.: 248,592

[22] Filed: May 16, 1994

Related U.S. Application Data

[63] Continuation-in-part of Ser. No. 871,670, Apr. 21, 1992, abandoned.

[30] Foreign Application Priority Data

Sep. 30, 1991 [JP] Japan .................................. 3-278685

[51] Int. Cl.$^6$ ....................................................... A63J 17/00
[52] U.S. Cl. ............................................................. 84/464 R
[58] Field of Search .............................. 84/464 A, 464 R, 84/616, 654, 681

[56] References Cited

U.S. PATENT DOCUMENTS

| | | | |
|---|---|---|---|
| 3,222,574 | 12/1965 | Silvestri, Jr. . | |
| 3,895,553 | 7/1975 | Kawamoto . | |
| 4,078,469 | 3/1978 | Calvin | 84/454 |
| 4,300,225 | 11/1981 | Lambl | 44/464 R X |
| 4,327,623 | 5/1982 | Mochida et al. . | |
| 4,440,059 | 4/1984 | Hunter | 84/464 R |
| 4,692,117 | 9/1987 | Goodwin | 84/464 R X |
| 4,928,568 | 5/1990 | Snavely | 84/464 R |
| 4,995,026 | 2/1991 | Makabe et al. . | |
| 5,078,039 | 1/1992 | Tulk et al. | 84/464 R |
| 5,113,738 | 5/1992 | Krucoff | 84/464 R |
| 5,121,435 | 6/1992 | Chen | 84/464 R X |
| 5,402,702 | 4/1995 | Hata | 84/464 R |

Primary Examiner—William M. Shoop, Jr.
Assistant Examiner—Jeffrey W. Donels
Attorney, Agent, or Firm—Rogers & Killeen

[57] ABSTRACT

There is provided a compact, low-cost decorative light blinking device which is capable of accurately and precisely blinking illuminants of channels in response to music (the frequency of sound), and which has circuitry with reduced number of components. An audio frequency range (from 20 Hz to 20 KHz) can be divided into about 10 frequencies.

The decorative light blinking device flashing to music, includes a plurality of channels, each including a buffer amplifier, a PLL circuit connected to the buffer amplifier and having a phase comparator, a loop filter and voltage control oscillator and lock state detecting circuit which generates a positive or negative logic digital output signal, a time constant circuit connected to the PLL circuit, an output circuit connected to the time constant circuit, and a decorative illuminant connected to the output circuit and turned on or off by an output from the output circuit, and a signal input point into which input terminals of the buffer amplifiers of the channels are formed, and through which an electric music signal is input from audio equipment, free-running frequencies and capture ranges of the PLL circuits of the channels being arbitrarily set to within an audio frequency range so that the free-running frequencies and the capture ranges do not basically overlap with each other, the PLL circuits being set so as to be locked with respect to only frequencies corresponding to the capture ranges which are arbitrarily set in all frequency components constituting the music signal, whereby the time constant circuits integrate an output signal from the lock state detecting circuits in the PLL circuits to convert the decorative illuminants from a state where the decorative illuminants are always turned off to a state where the same are turned on.

11 Claims, 4 Drawing Sheets

DECORATIVE LIGHT BLINKING DEVICE USING PLL CIRCUITRY FOR BLINKING TO MUSIC

This is a continuation-in-part of application Ser. No. 07/871,670 filed Apr. 21, 1992, now abandoned.

BACKGROUND OF THE INVENTION

1. Field of the Invention

The present invention relates to a decorative light blinking device which blinks in response to a change in a sound, such as a low-frequency sound of, e.g., a drum, a high-frequency sound of, e.g., cymbals, or a singing voice of all frequency components contained in music being played or broadcast. This light blinking device may be suitably installed in a place, such as a so-called "karaoke (do-it-yourself vocals) bar".

2. Description of the Related Art

In places where music can be heard, such as discotheques and karaoke bars, when visual effects are used to help create the atmosphere of the place, means have hitherto been employed in which illuminants emit light in response to music so as to create an atmosphere which appeals to the human eye and ear.

There has heretofore been a device which is operated through computer programs which are written beforehand in accordance with music, and another device which blinks illuminants in response to the dynamics or high and low frequencies of a sound. Such well-known devices are employed when illuminants are appropriately blinked in response to various types of music, such as one in which the sounds of a drum and cymbals and bass and soprano voices are intermixed. The former device operating through programs is capable of very precisely blinking illuminants in response to music which has already been programmed. Such a device, however, is not capable of immediately coping with music which has not yet been programmed, and thus it lacks versatility. In addition, the device is not suitable for general use because it is expensive, and is therefore only suitable for business use in limited types of places.

The above device for blinking illuminants in response to the dynamics of a sound is a device which responds to a sound to blink illuminants regardless of the type of sound, for example, whether it is the sound of a drum or symbols, as long as the pressure of the sound is the same. When the sound pressure of music happens to be increased at the climax of the music, such a device may be operated so as to keep the illuminants turned on, and is thus insufficient for visual effect purposes.

As opposed to the above device, there is a device for blinking illuminants in response to the frequency of a sound. This device does not have the above problem of the former device, and thus it is versatile and effective in producing visual effects. Such a device will be described below.

FIG. 3 is a block diagram showing the functions of a conventional device for blinking illuminants in response to the frequency of a sound. Referring to FIG. 3, reference character 20L denotes a low-pass filer; 21, amplifiers; 22, detecting circuits; 23, time constant circuits; 24, voltage comparators; 25, reference voltage applied to the voltage comparators 24; 26, output circuits; and 27, illuminants. The low-pass filter 20L, the amplifier 21, the detecting circuit 22, the time constant circuit 23, the voltage comparator 24, the output circuit 26, and the illuminant 27 constitute a one-channel functional block corresponding to a low frequency of sound. In FIG. 3, reference character 20B denotes a bandpass filter; 20B', another bandpass filter having the same circuit structure as that of the bandpass filter 20B and a frequency band different from that of the bandpass filter 20B; and 20H, a high-pass filter. Such a one-channel functional block, which is a light blinking block, is attached to the back of each of the filters. The number of filters corresponds to the number of frequencies. In FIG. 3, like numerals denote the same components in the same functional blocks. Symbol In denotes a point at which an electric music signal is input.

When the electric music signal is input from equipment, such as audio equipment Ad, to the input point In, it is first transmitted to the low-pass filter 20L, the high-pass filter 20H, and bandpass filters 20B and 20B' having the different pass bands, and then classified according to a frequency set in each filter. By this time, since the music signal has been attenuated by an AC resistant component, which is an LCR constituting each filter, the amplifiers 21, connected to the filters 20L 20B, 20B' and 20H, amplify the signal. The output of each amplifier 21 is passed through each detecting circuit 22 to convert it into a DC component, which in turn is converted by each time constant circuit 23 into a voltage level of a direct current.

Voltage outputs from the time constant circuits 23 increase as the frequencies of the electric music signal input through the input point In approach the center frequencies set in the filters 20L, 20B, 20B' and 20H. In other words, when a frequency of all frequencies contained in music is close to the center frequency of each filter, the level of the voltage output from each time constant circuit 23 increases.

The voltage output from each time constant circuit 23 is input to each voltage comparator 24 to compare it with the reference voltage 25. If the output voltage exceeds the reference voltage 25, the output circuit 26 corresponding to the output voltage is operated to blink the corresponding illuminant 27.

As described previously, when the center frequencies of the filters are set to the frequency bands of the sound of a drum and cymbals, the above device blinks illuminants in accordance with such frequency bands. However, the filters used in the device are of a general-purpose type and have approximately −6 dB/oct. Therefore, an audio frequency range (from about 20 Hz to 20 KHz) can be divided into three bands at most when illuminants are reliably blinked on and off. The number of frequency bands into which the audio frequency range is divided is equal to the number of illuminants blinking on and off. The illuminants do not blink precisely and synchronously in response to the dynamics of the sound of music.

Even if a device overcomes the above problem, filters, each having approximately −18 dB/oct., would have to be utilized because the extent to which amplifiers can amplify the signal and the accuracy with which voltage comparators can operate are limited. In addition, the circuitry in such a device is complicated. The above audio frequency range can be divided into five bands at most. For this reason, such a device is ineffective in producing visual effects and operates to blink illuminants on and off in a monotonous manner. Also, despite the high cost of the device, it operates in a manner similar to that of a toy and thus it does not sufficiently satisfy human visual sensitivity.

SUMMARY OF THE INVENTION

The present invention has been made to solve the above problems of the conventional devices. The object of this invention is to provide a compact, low-cost decorative light blinking device which is capable of accurately and precisely blinking illuminants of channels in response to music (the frequency of sound), and which is also capable of reliably reducing the number of components required for circuitry. An audio frequency range (from about 20 Hz to 20 KHz) can be divided into about 10 frequencies.

To achieve the above object, this invention provides a decorative light blinking device flashing to music, comprising: a plurality of channels, each including a buffer amplifier, a PLL circuit connected to the buffer amplifier and having a phase comparator, a loop filter and voltage control oscillator and lock state detecting circuit which generates a positive or negative logic digital output signal, a time constant circuit connected to the PLL circuit, an output circuit connected to the time constant circuit, and a decorative illuminant connected to the output circuit and turned on or off by an output from the output circuit; and a signal input point into which input terminals of the buffer amplifiers of the channels are formed, and through which an electric music signal is input from audio equipment, free-running frequencies and capture ranges of the PLL circuits of the channels being arbitrarily set to within an audio frequency range so that the free-running frequencies and the capture ranges do not basically overlap with each other, the PLL circuits being set so as to be locked with respect to only frequencies corresponding to the capture ranges which are arbitrarily set in all frequency components constituting the music signal, whereby the time constant circuits integrate an output signal from the lock state detecting circuits in the PLL circuits so as to obtain a stable signal which operates the output circuits to convert the decorative illuminants from a state where the decorative illuminants are always turned off to a state where the same are turned on.

The present invention may have an arrangement that the decorative illuminants are converted from a state where the decorative illuminants are always turned on to a state where same are turned off.

DESCRIPTION OF THE PREFERRED EMBODIMENT

Figure 1:
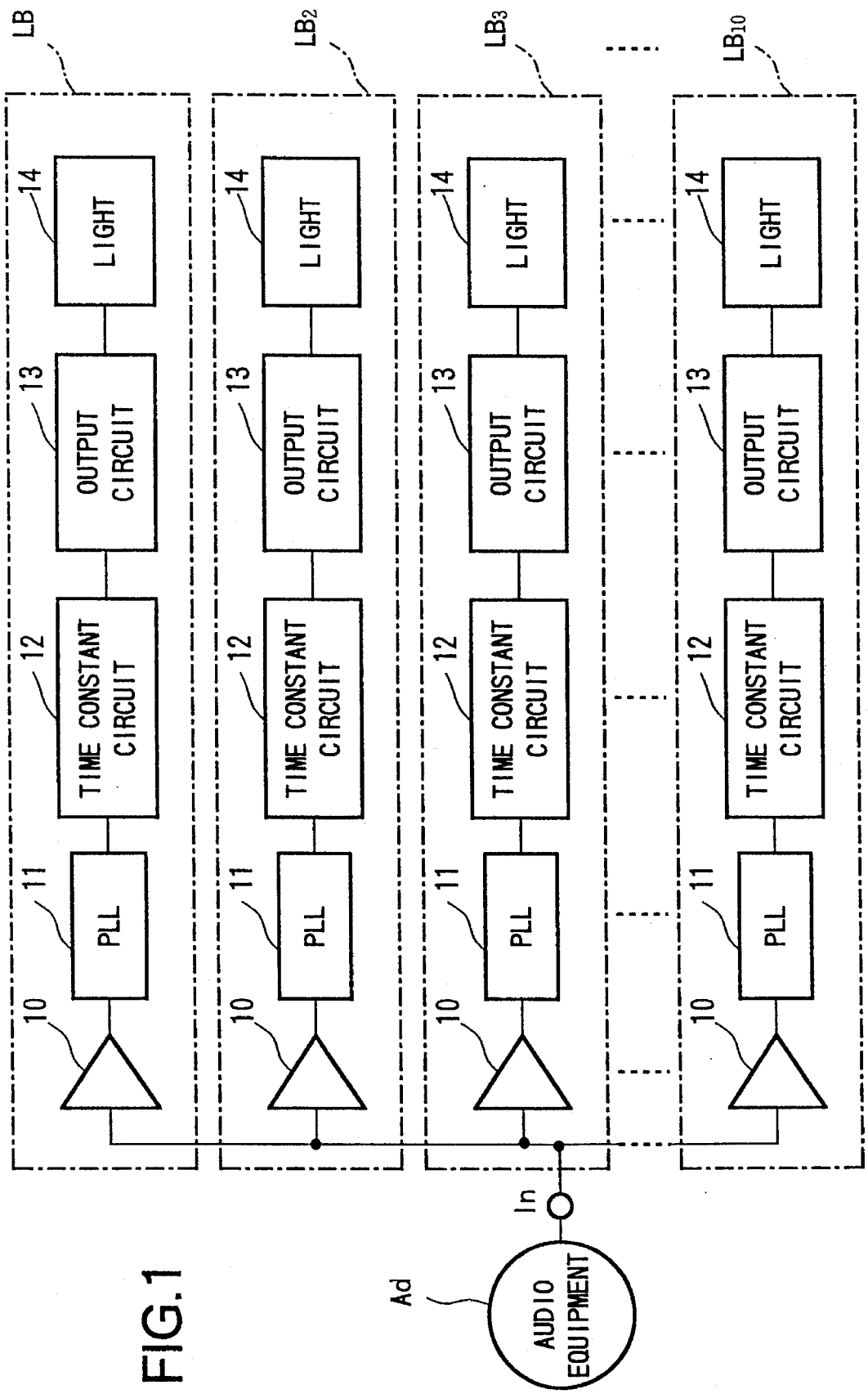
FIG. 1 is a block diagram showing the functions of an embodiment of a light blinking device according to the present invention.

An embodiment of a light blinking device according to the present invention will now be described with reference to FIG. 1. Referring to this drawing, numeral 10 denotes buffer amplifiers, and numeral 11 denotes PLL circuits. The input terminal of a phase comparator 11a in each PLL circuit 11 is connected to the output terminal of each buffer amplifier 10. As shown in FIG. 2, each PLL circuit 11 has a circuit 11d for detecting whether positive logic output from the PLL circuit 11 is locked (hereinafter referred to as a positive-logic-output lock state detecting circuit 11d). Numeral 12 denotes time constant circuits connected to the PLL circuits 11. The time constant circuits 12 first integrate signals which are locked state positive logic output from the positive-logic output lock state detecting circuit 11d and indicate that the PLL circuits are locked. These time constant circuits 12 then convert the signals to signals of a voltage level, and then output them to circuits in the next stage. Numeral 13 denotes output circuits which are connected to the time constant circuits 12 and operated by the signals output from the circuits 12. Numeral 14 denotes illuminants which are connected to the output circuits 13 and turned on by the output circuits 13. In this invention, any illuminant can be employed regardless of the method of emitting light, as long as it is capable of radiating visible rays. For instance, LEDs, incandenscent lamps, and discharge tubes, such as neon and fluorescent tubes, may be used as illuminants. Needless to say, each output circuit 13 is constructed corresponding to a method by which each illuminant 14 emits light.

In the light blinking device of this invention, the above buffer amplifier 10, the PLL circuit 11, the time constant circuit 12, the output circuit 13 and the illuminant 14 constitute one light blinking block LB, which is a one-channel functional block, corresponding to any one of the frequencies in an audio frequency range. For example, when a light blinking device is constructed in such a manner that the audio frequency range of a music signal is divided into, for instance, 10 frequencies, 10 illuminants blink on and off. Thus, a total of 10 parallel light blinking blocks, each forming 1 channel, are arranged.

Figure 2:
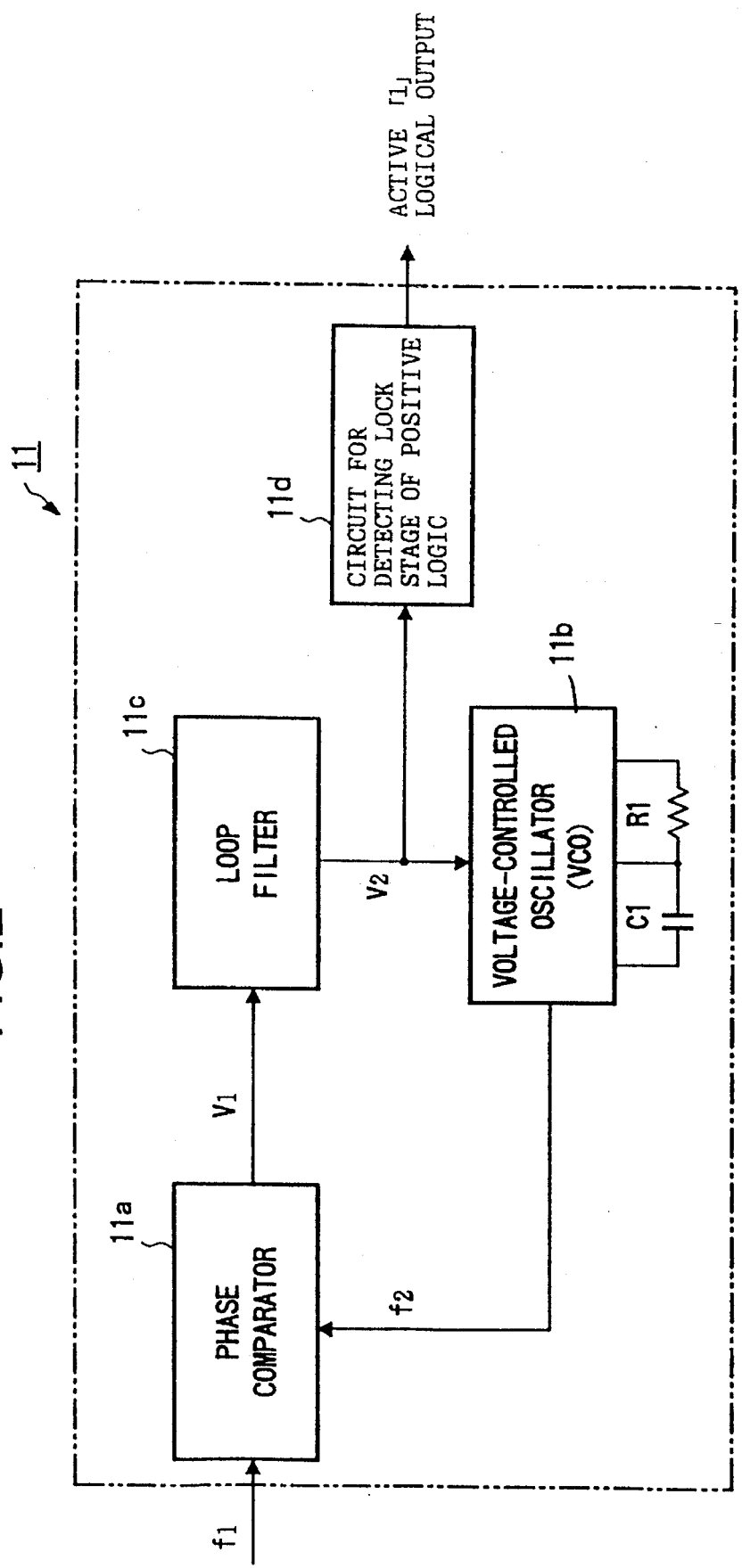
FIG. 2 is a block digram showing the functions of a PLL circuit used in the light blinking device of this invention.
Figure 3:
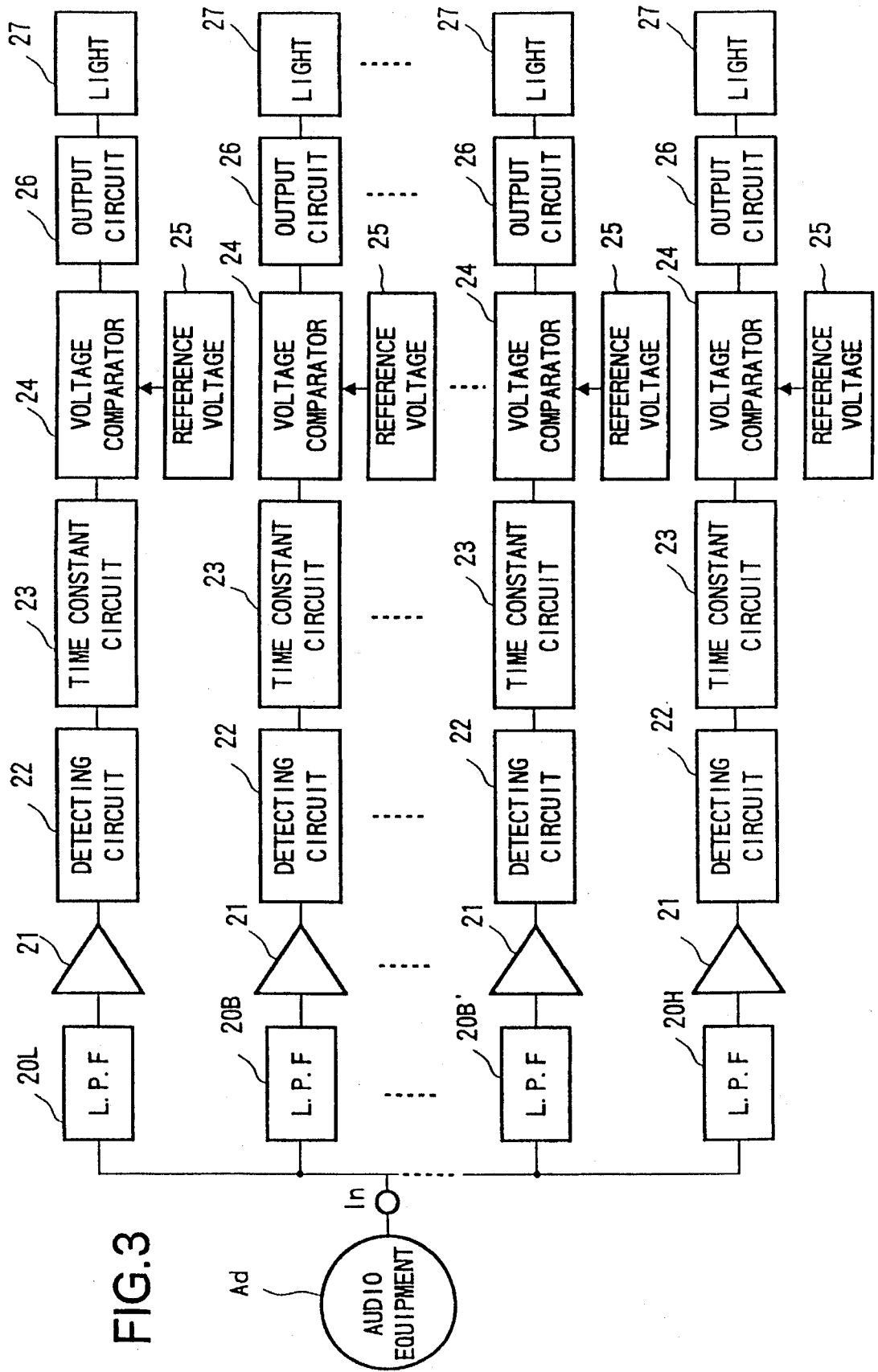
FIG. 3 is a block diagram showing the functions of the conventional device.

In FIG. 1, which shows an embodiment of the light blinking device of this invention, only four light blinking blocks LB, LB2, LB3 and LB10, each forming 1 channel, are illustrated for the sake of convenience of description and representation as the drawing. In FIG. 1, like reference characters denote like functional blocks. The input terminals of the buffer amplifiers 10 in the light blinking blocks are formed into one signal input point In, to which an electric music signal coming from, for example, audio equipment Ad, is input.

In the light blinking device of this invention, the illuminants 14 in the respective light blinking blocks LB to LB10 controllably blink in correspondence to frequencies into which the audio frequency range (20 Hz to 20 KHz) is divided. The audio frequency range is divided so that in principle these frequencies are not overlapped with each other. Such operation will be described below.

In the PLL circuits 11 of the light blinking block LB to LB10, free-running frequencies of, e.g., 100 Hz, 500 Hz, 1 KHz, 2 KHz, 4 KHz, 6 KHz, 8 KHz, 15 KHz, and 18 KHz are set to Voltage-Controlled Oscillator (VCOs) 11b, respectively. Capture ranges used for the free-running frequencies also set to the respective PLL circuits 11. The capture ranges are set to as small as possible so that the ranges within which the PLL circuits operate their frequencies do not overlap with each other. Oscillation characteristics of each VCO 11b are changed or a variable resistor is utilized to adjust the level of a control voltage V2 applied to each VCO 11b, whereby each capture range is adjusted. In FIG. 2, reference character 11a denotes a phase comparator which compares in real time the phase of a frequency f1 with that of a frequency f2 contained in the music signal. The frequency f1 is input through each buffer amplifier 10, whereas the frequency f2 is output through each VCO 11b. Reference character 11c denotes a loop filter which integrates an output V1 from the phase comparator 11a to generate a positive or negative output voltage V2 of a direct current component. This output voltage V2 serves as the control voltage applied to the VCO 11b. Reference character C1 denotes a capacitor, and R1 denotes a resistor, both included in each VCO 11b.

When each PLL circuit 11 shown in FIG. 2 is locked, it is controlled by the output V2 from each loop filter 11c so that each VCO 11b follows the frequency f1 input to each phase comparator 11a. However, when the frequency f1 input to each phase comparator 11a is out of its lock range, each VCO 11b is not capable of following the frequency f1. In other words, each loop filter 11c does not generate its output V2.

It is therefore possible in the PLL circuit 11 shown in FIG. 2 to detect whether each PLL circuit 11 is locked or not by detecting whether there is an output V2 from each loop filter 11c. Reference character 11d denotes a circuit for detecting whether positive logic output from each PLL circuit 11 is locked or not (hereinafter referred to as a positive-logic-output lock state detecting circuit 11d). This positive-logic-output lock state detecting circuit 11d is disposed in each PLL circuit 11 and outputs the result of detection when it is active "1". The positive-logic-output lock state detecting circuit 11d detects whether each PLL circuit 11 is locked or not to output a positive logic signal, that is, it outputs "1" when the PLL circuit 11 is locked and outputs "0" when the same is not locked. The structure is formed such that a detection signal from the positive-logic-output lock state detecting circuit 11d is input to each time constant circuit 12 as an effective component.

Figure 4:
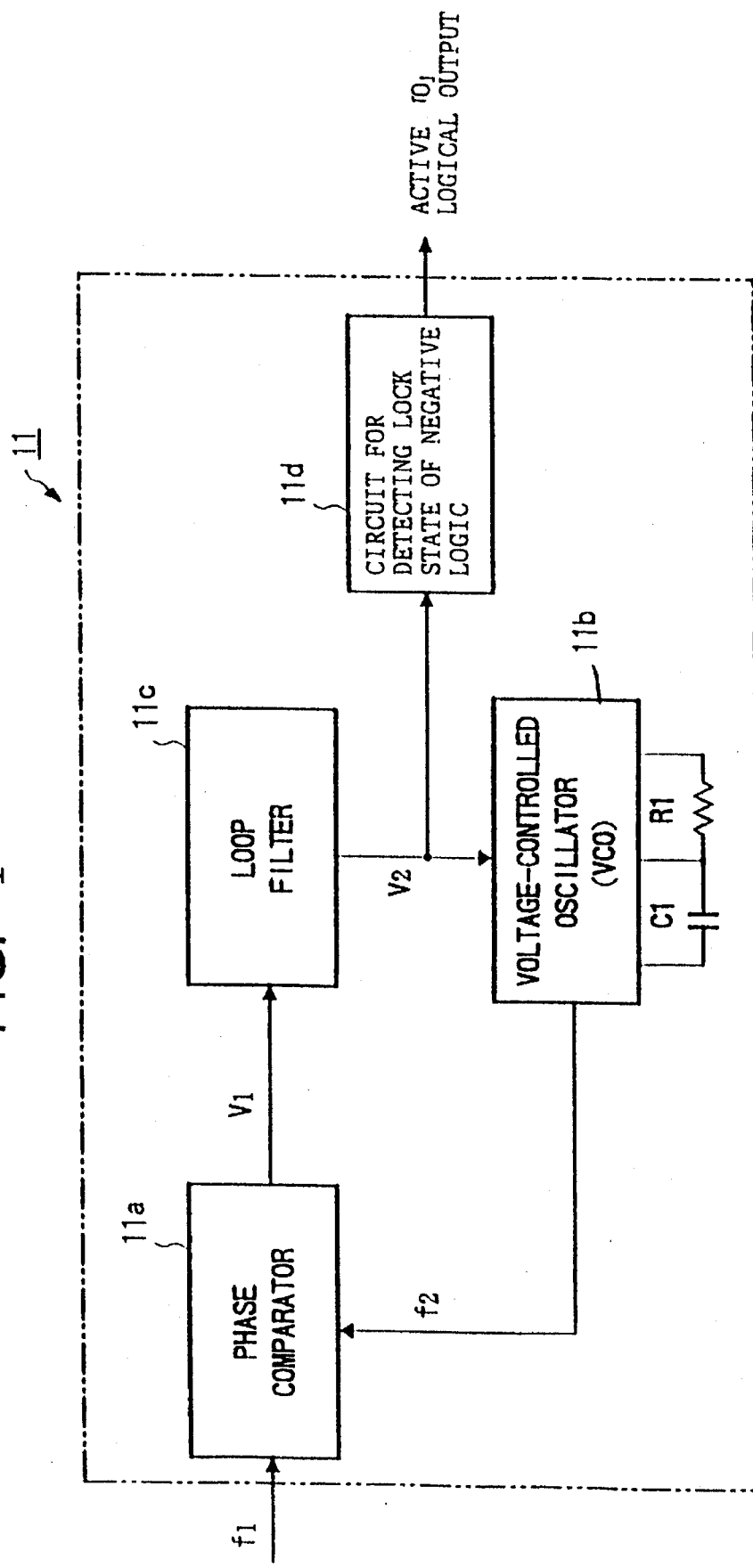
FIG. 4 is a block diagram showing the functions of another embodiment of a PLL circuit used in the light blinking device of this invention.

This invention may arranged such that the detection whether the PLL circuit 11 is locked or not is detected by a negative logic output lock state detecting circuit 11d' as shown in FIG. 4. The logic of a negative logic output from the negative logic output lock state detecting circuit 11d' opposes that the description made with reference to FIG. 2. When the negative logic output lock state detecting circuit 11d' is active "0", it outputs the result of the detection. The negative logic output lock state detecting circuit 11d' outputs, as an effective output, "0" when the PLL circuit 11 is locked and outputs "1" when the same is not locked. Therefore, the output from the negative logic output lock state detecting circuit 11d' is input to each time constant circuit 12.

The free-running frequencies and the capture ranges which are set in the VCOs 11b of the PLL circuits 11 in light blinking blocks LB to LB10 differ from each other. The free-running frequencies and the capture ranges are within the audio frequency range. The different frequencies are utilized to detect whether the PLL circuits 11 in the light blinking blocks LB to LB10, each forming a channel, are locked or not. In this way, after it has been detected as a positive logic output or a negative logic output that each PLL circuit 11 in each light blinking block is locked or not, a detection signal output from each positive-logic-output lock state detecting circuit 11d is integrated in each time constant circuit 12. An integrated signal is supplied to each output circuit 13. Although the output circuit 13 is, in two ways (omitted from illustration), driven in response to a positive logic input or negative logic input depending upon the input method, coincidence with the detection output from the detection circuit 11d or 11d' is made to turn each illuminant 14 on.

Thus, each illuminant 14 is turned on only when each PLL circuit 11 in each light blinking block is locked. Each illuminant 14 is not turned on when each PLL circuit 11 is not locked.

The same music signal from audio equipment Ad or the like is input through the input point In and each buffer lamp 10 to the light blinking blocks LB to LB10. However, because of the different free-running frequencies and capture ranges which are set in the PLL circuits 11, the illuminants 14 in the light blinking blocks LB to LB10 flash in a different manner.

The present invention is able to realize a device that blinks illuminants 14 in a manner contrary to that of the foregoing embodiment, that is, the illuminants 14 are turned off only when the PLL circuit 11 are locked and the illuminants 14 are always turned on when they are not locked. The device of the foregoing type will now be described. The foregoing device turns of the illuminants 14 only when the PLL circuits 11 are locked and turns off the illuminants 14 when the PLL circuits 11 are not locked by making coincide the logic of the detection output from the positive-logic-output lock state detecting circuit 11d or the negative logic output lock state detecting circuit 11d' and the positive logic input drive or negative logic input drive of the output circuit 13. On the other hand, the state of the logic from the detection output from the positive-logic-output lock state detecting circuit 11d or the negative logic output lock state detecting circuit 11d' and state of the positive logic input drive or negative logic input drive of the output circuit 13 may be made to be different. That is, if the positive-logic-output lock state detecting circuit 11d or the negative logic output lock state detecting circuit 11d' outputs a positive logic detection output, the negative logic input drive of the output circuit 13 is used. If the positive-logic-output lock state detecting circuit 11d or the negative logic output lock state detecting circuit 11d' outputs a negative logic detection output, the positive logic input drive of the output circuit 13 is used. Thus, a device that blinks illuminants in a manner contrary to the foregoing embodiment can be realized without any change in each circuit block. It should be noted that the foregoing device, of course, turns on or off illuminants 14 of each of the light blinking blocks LB to LB10 in different manners.

In the above embodiment of the light blinking device according to this invention, the free-running frequencies of the VCOs 11b in the respective PLL circuits 11 are set so as not to overlap with each other. However, the free-running frequencies of the VCOs 11b can be set to 12 equal temperament scales on the basis of 440 Hz. Each capture range can be narrowed to within a range where various operations of the PLL circuits 11 are not effected. Such setting and reduction make it possible for the illuminants 14 to blink in correspondence to the 12 equal temperament scales which are contained in the music signal transmitted through the input point In. The illuminants 14 blink substantially corresponding to the 12 equal temperament scales of the music, and light comes in harmony with the music.

In the embodiment shown in FIG. 1, the output terminal of the audio equipment Ad is connected to the input point In of the light blinking device to input the music signal. Instead of the input point In, a microphone (not shown) having a microphone amplifier may be attached to the outside of the light blinking device or may be built into it. The foregoing microphone has a microphone amplifier. Because of such as music signal which is input to the light blinking device.

When the light blinking device having such a microphone is mounted on a vehicle, the microphone may pick up various vibrations, thus resulting in errors in picking up the sound of music. To prevent or control such errors a vibration-deadening material, such as a damping material, may be appropriately interposed between the microphone and a member to which it is attached.

In this embodiment, the output circuits 13 are employed to blink illuminants in correspondence to the different frequencies of a music signal. However, an external output terminal may also be employed to connect additional illuminants and a motor parallel to the illuminants 14. In such a structure, in addition to the illuminants 14, the additional illuminants are blinked, and a movable display device is operated by the external motor synchronously with the illuminants 14.

An adapter (not shown) exclusively used for reception may be disposed in front of the input point In and connected to a transmission device. The transmission device sends a music signal to the input point In through a transmitting medium, such as light, radiowaves or infrared rays. In this way, the format in which a music signal is transmitted to the input point In can be enlarged, thus widening the range within which the light blinking device can be utilized.

As has been described above, according to this invention, PLL circuits are utilized to blink illuminants in correspondence to a plurality of frequencies of an audio frequency range contained in a music signal. The audio frequency range is divided so as not to overlap with each other. As compared with the conventional light blinking device operating synchronously with a music signal, the light blinking device of this invention does not require a band-pass filter or a detecting circuit, which is a circuit component, thus reducing the number of components and assembly time.

PLL circuits employed are formed on a single chip because of an IC, and are therefore easily obtained at low cost, thus further enhancing the above advantages. The PLL circuits, characteristics of which are easy to set or modify operational conditions, are utilized to operate the output circuits which turn the illuminants on. By setting and modifying these characteristics, the mode in which the illuminants and the like are blinked can be changed in various manners which cannot be realized by the conventional device. The light blinking device of this invention can be effectively used as a decorative device.

What is claimed is:

1. A decorative light blinking device flashing to music, comprising:

a plurality of channels, each including a buffer amplifier, a PLL circuit connected to said buffer amplifier and having a phase comparator, a loop filter and voltage control oscillator and lock state detecting circuit which generates a positive or negative logic digital output signal, a time constant circuit connected to said PLL circuit, an output circuit connected to said time constant circuit, and a decorative illuminant connected to said output circuit and turned on or off by an output from said output circuit; and a signal input point into which input terminals of said buffer amplifiers of said channels are formed, and through which an electric music signal is input from audio equipment, free-running frequencies and capture ranges of said PLL circuits of said channels being arbitrarily set to within an audio frequency range so that the free-running frequencies and the capture ranges do not overlap with each other, said PLL circuits being set so as to be locked with respect to only frequencies corresponding to said capture ranges which are arbitrarily set in all frequency components constituting said music signal, whereby said time constant circuits integrate an output signal from said lock state detecting circuits in said PLL circuits so as to obtain a stable signal which operates said output circuits to convert said decorative illuminants from a state where said decorative illuminants are always turned off to a state where the same are turned on.

2. A decorative light blinking device according to claim 1, wherein said decorative illuminants are converted from a state where said decorative illuminants are always turned on to a state where same are turned off.

3. A decorative light blinking device according to claim 1, wherein the free-running frequencies of said PLL circuits are set to 12 equal temperament scales based upon $A=a^1-440$ Hz, which is defined by an international standard, and wherein the capture ranges of said PLL circuits are narrowed, whereby the decorative illuminants are blinked on and off in correspondence only to said 12 equal temperament scales used in music which is input in the form of the music signal.

4. A decorative light blinking device according to claim 1 further comprising:

a microphone incorporated into said device or an input terminal capable of connecting a microphone to said device from the outside;

a microphone amplifier; and an input switching device connected to said microphone, whereby said microphone picks up the sound of music output through a speaker, and this sound is converted into the electric music signal which is input to the signal input point.

5. A decorative light blinking device according to claim 4, wherein when said device is mounted on a vehicle, a vibration-damping material, such as a sponge material or a glass-wool material, is interposed between said microphone and a housing for said device in order to control errors in picking up the sound of the music, such errors being caused by road conditions and engine vibrations of the vehicle.

6. A decorative light blinking device according to claim 1 further comprising an external output terminal for connecting a motor and additional illuminants in parallel to said decorative illuminants which are connected to said output circuits and incorporated into said device, said additional illuminants being provided outside said device.

7. A decorative light blinking device according to claim 1 further comprising an adapter exclusively used for receiving a voice signal which is transmitted through transmission equipment utilizing an optical fiber cable radiowaves or infrared rays to transmit the voice signal in a cordless manner, whereby the electric music signal input through said adapter is transmitted to said input point to operate said device.

8. A decorative light blinking device according to claim 2, wherein the free-running frequencies of said PLL circuits are set to 12 equal temperament scales based upon $A=a^1-440$ Hz, which is defined by an international standard, and wherein the capture ranges of said PLL circuits are narrowed, whereby the decorative illuminants are blinked on and off in correspondence only to said 12 equal temperament scales used in music which is input in the form of the music signal.

9. A decorative light blinking device according to claim 3 further comprising:

a microphone incorporated into said device or an input terminal capable of connecting a microphone to said device from the outside;

a microphone amplifier; and an input switching device connected to said microphone, whereby said microphone picks up the sound of music output through a speaker, and this sound is converted into the electric music signal which is input to the signal input point.

10. A decorative light blinking device according to claim 3 further comprising an external output terminal for connecting a motor and additional illuminants in parallel to said decorative illuminants which are connected to said output circuits and incorporated into said device, said additional illuminants being provided outside said device.

11. A decorative light blinking device according to claim 3 further comprising an adapter exclusively used for receiving a voice signal which is transmitted through transmission equipment utilizing an optical fiber cable radiowaves or infrared rays to transmit the voice signal in a cordless manner, whereby the electric music signal input through said adapter is transmitted to said input point to operate said device.

* * * * *